United States Patent
Perfect et al.

(10) Patent No.: US 10,554,492 B2
(45) Date of Patent: Feb. 4, 2020

(54) PHYSICAL MACHINE MANAGEMENT IN DISTRIBUTED COMPUTING SYSTEMS

(71) Applicant: Microsoft Technology Licensing, LLC, Redmond, WA (US)

(72) Inventors: Richard Perfect, Puyallup, WA (US); Tanmoy Dasgupta, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 201 days.

(21) Appl. No.: 15/618,686

(22) Filed: Jun. 9, 2017

(65) Prior Publication Data

US 2018/0359150 A1 Dec. 13, 2018

(51) Int. Cl.
H04L 12/24 (2006.01)
H04L 12/26 (2006.01)
H04L 29/08 (2006.01)

(52) U.S. Cl.
CPC ...... *H04L 41/0846* (2013.01); *H04L 41/0893* (2013.01); *H04L 41/082* (2013.01); *H04L 43/16* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 6,854,069 B2 | 2/2005 | Kampe et al. | |
| 8,887,006 B2 | 11/2014 | Xia et al. | |
| 9,026,864 B2 | 5/2015 | Dake et al. | |
| 9,231,963 B2 | 1/2016 | Dokey et al. | |
| 9,367,379 B1* | 6/2016 | Burke | G06F 11/0706 |
| 2010/0058432 A1 | 3/2010 | Neystadt et al. | |
| 2011/0276695 A1* | 11/2011 | Maldaner | G06F 9/5083 709/226 |
| 2013/0298243 A1 | 11/2013 | Kumar et al. | |
| 2014/0215279 A1* | 7/2014 | Houseman | G06F 11/2268 714/47.3 |
| 2014/0281700 A1 | 9/2014 | Nagesharao et al. | |

(Continued)

OTHER PUBLICATIONS

Mohamed, Jeelani, "Service Healing—Auto-recovery of Virtual Machines", https://azure.microsoft.com/en-in/blog/service-healing-auto-recovery-of-virtual-machines/, Published on: Apr. 7, 2015, 5 pages.

*Primary Examiner* — Natisha D Cox
(74) *Attorney, Agent, or Firm* — Liang IP, PLLC

(57) ABSTRACT

Techniques for physical machine management in distributed computing systems are disclosed herein. In one embodiment, a method includes accessing data representing an operating status indicating whether individual physical machines are operating satisfactorily in accordance with one or more target operating conditions. The method can then include based on the accessed data, identifying a list of the physical machines that are not operating satisfactorily in accordance with at least one of the target operating conditions but have not failed yet and determining whether the individually physical machines in the list are hosting one or more virtual machines. If one of the physical machines in the list is not hosting one or more virtual machines, overwriting at least one of an operating system, a user application, or a device driver on the one of the physical machines with a new copy.

20 Claims, 10 Drawing Sheets

(56) References Cited

U.S. PATENT DOCUMENTS

2016/0041889 A1* 2/2016 Banerjee ............... G06F 11/203
                                                714/4.11
2016/0124833 A1   5/2016 Gupta et al.
2017/0116084 A1*  4/2017 Liu ..................... G06F 11/1438
2018/0062913 A1*  3/2018 Hook .................. H04L 41/0668

* cited by examiner

PHYSICAL MACHINE MANAGEMENT IN DISTRIBUTED COMPUTING SYSTEMS

BACKGROUND

Distributed computing systems typically include multiple routers, switches, bridges, and other network devices that interconnect many servers, network storage devices, and other types of nodes via wired or wireless network links. The individual nodes can cooperate to execute user applications to provide computing services via the Internet or other suitable networks. Such computing services are commonly referred to as "cloud computing services" or "cloud services." For example, the individual nodes can cooperate with one another to receive, store, and facilitate retrieval of user data. Such a data storage technique is commonly referred to as "cloud storage."

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementing various cloud computing services typically involves utilizing many physical machines ("PMs"), such as servers or other suitable types of computing devices, interconnected by a computer network to provide application execution, data storage, data retrieval, or other suitable computing operations. A management controller, such as a fabric controller, a cluster controller, etc., is often utilized to monitor an operating status of and facilitate functionalities performed by the individual physical machines. For example, the cluster controller can monitor whether a physical machine or components thereof has failed. In response to detecting a failure of the physical machine or components thereof, the management controller can attempt to remedy the detected failure by, for instance, migrating virtual machines ("VMs") hosted on the failed physical machine to other physical machines in the distributed computing system, restarting the failed physical machine, and/or perform other suitable operations.

The foregoing remedial technique, however, can result in service interruptions to users because the remedial actions are reactive. For instance, only after a physical machine has failed, e.g., ceased to provide desired computing services or even accessible via a computer network, the management controller can issue commands to initiate various remedial actions, such as migrating or redeploying VMs previously hosted on the failed physical machine. As such, computing services provided by the VMs can be interrupted during remediation of such failures. Such interruption can negatively impact user experience of the cloud computing services, generate a large volume of technical service calls, or cause other types of inefficiencies.

The inventors have recognized that before a physical machine fails partially or completely, the physical machine typically would exhibit certain "symptoms" or can have certain operating characteristics. Such symptoms or operating characteristics can be used as indicators of likelihood of failure or a level of health associated with the physical machines. For example, a physical machine is likely to fail when certain local computing services are not functioning correctly. Example local computing services can include domain name service ("DNS"), remote access service (e.g., PowerShell remoting), operating system interfaces (e.g., Windows Management Instrumentation or "WMI"), and software update services. In another example, a physical machine is likely to fail when certain hardware issues are present in the physical machine. Example hardware issues can include errors related to a processor, a chassis, a storage volume, a disk drive, system read only memory ("ROM") firmware, Ethernet port, or other types of hardware components in the physical machine.

Several embodiments of the disclosed technology are directed to proactively monitoring and "healing" physical machines based on certain operating conditions of the physical machines. In certain embodiments, a machine manager that includes an interface component, a PM selector, a PM refresher, and a refresh monitor can be implemented in the distributed computing system. The interface component can be configured to receive and store records of machine status from probes deployed at the individual physical machines. The probes can be configured to determine whether the individual physical machines are "healthy" or "unhealthy" based on one or more software or hardware related symptoms, characteristics, status, and/or operating conditions. For example, when a probe determines that a status of a physical machine involves any of the foregoing example symptoms or operating characteristics, the probe can indicate that the physical machine is "unhealthy" by failing to meet one or more of the operating conditions. In one implementation, the indication can be recorded as a database record of machine status in a network database at the machine manager or at other suitable components of the distributed computing system. In other implementations, the indication can be forwarded to the management controller for immediate action, or may be processed in other suitable manners.

Based on the retrieved data records in the network database, the PM selector of the machine manager can be configured to select a list of unhealthy physical machines for "refreshing" (e.g., via reimaging, software updating, restarting, etc.) periodically or on another suitable basis. In certain implementations, the PM selector can be configured to query the network database for a list of the physical machines marked as unhealthy and select a subset of the physical machines for refreshing based on one or more example criteria listed below:

- a maximum number of physical machines allowed to be offline in an action zone, cluster, and/or datacenter;
- one or more priority levels of computing services provided by the list of physical machines;
- a time the individual physical machines were last refreshed; or
- a severity level of the symptoms and/or operating characteristics of the individual physical machines in the list.

In other implementations, the PM selector can be configured to select the physical machines randomly, serially, or based on other suitable criteria.

Once selected, the PM refresher can be configured to determine whether the selected physical machines are currently hosting VMs or other suitable types of computing services (e.g., virtual switches). The PM refresher can make such a determination by accessing a VM assignment database in the distributed computing system or via other suitable techniques. In response to determining that a physical machine is not hosting any VMs or disallowed computing services, the PM refresher can instruct the physical machine to initiate a refreshing process on the physical machine. Otherwise, the PM refresher can request the management controller to migrate and redeploy VMs or other computing services from the unhealthy physical machines to other healthy physical machines in the distributed computing system. Once migration of the VMs and computing services is complete, the PM refresher can be configured to instruct the physical machine to initiate a refreshing process.

The PM refresher can also be configured to determine a sequence of operations and cause the physical machine to perform the operations in the determined sequence to bring an unhealthy physical machine to a healthy state. For example, the PM refresher can cause installation a new copy of an operating system, one or more user applications, a virtual machine monitor, one or more device drivers, or other suitable software components. In other examples, the refresh component can also cause installation of updates of the foregoing software components in the physical machine. In further examples, the PM refresher can also be configured to reboot the physical machine, recheck an operating status of the rebooted physical machine, and mark the physical machine as "healthy" in the network database upon successful completion of rechecking. In yet further examples, the PM refresher can be configured to perform power cycling, software patching, or other suitable operations in addition to or in lieu of the foregoing operations to bring the physical machine to a healthy state.

During a refreshing process, the refresh monitor can be configured to monitor and report errors encountered during the refreshing process. For example, the refresh monitor can be configured to monitor whether an elapsed time of the refreshing process exceeds a preset threshold. In response to determining that the elapsed time exceeds the preset threshold, the refresh monitor can trigger an alarm to, for instance, the management controller or other suitable entity. In response to determining that the elapsed time does not exceed the preset threshold, the refresh monitor can record a time at which the refreshing process is successfully completed in the network database. In other examples, the refresh monitor can be configured to monitor the refreshing process by monitoring execution of the sequence of operations determined by the refresh component and/or perform other suitable operations.

Several embodiments of the disclosed technology can improve user experience of cloud computing services by proactively monitor and heal physical machines before the physical machines completely fail and cause service interruption. For example, by periodically monitor for certain symptoms or operating characteristics of the physical machines, operating difficulties encountered by the physical machines can be addressed before such operating difficulties can cause a partial or complete failure of the physical machine. As such, occurrences or risks of physical machine failure can be reduced to result in reduced computing service interruptions to users.

DETAILED DESCRIPTION

Figure 1A:
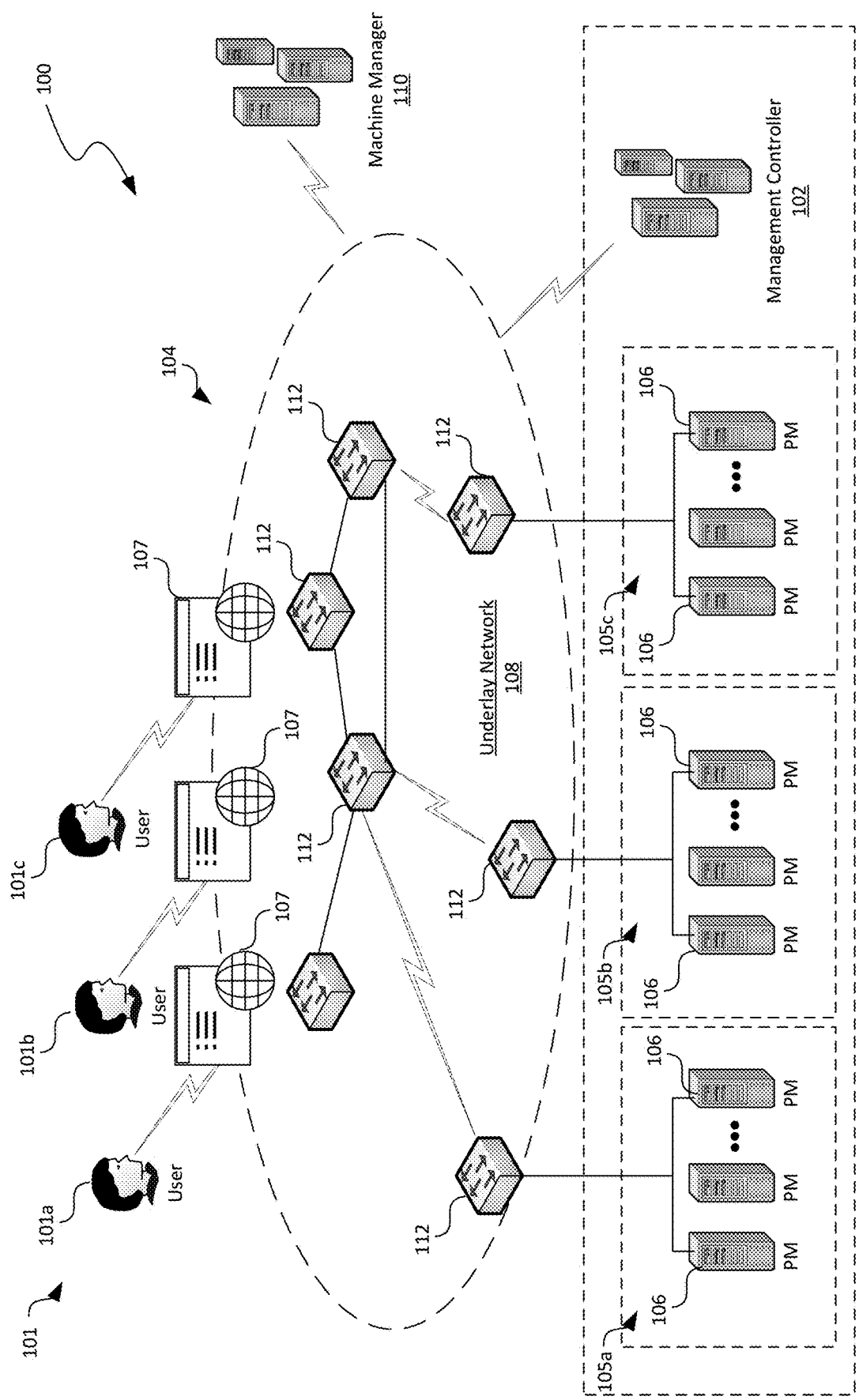
FIG. 1A is a schematic diagram of a distributed computing system implementing physical machine management in accordance with embodiments of the disclosed technology.

Certain embodiments of computing systems, devices, components, modules, routines, and processes for managing physical machines in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1A-5.

As used herein, the term "computing cluster" generally refers to a computer system having a plurality of network devices that interconnect multiple servers or physical machines to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "physical machine" generally refers to a server or other suitable types of computing device configured to implement one or more virtual machines, virtual routers, virtual gateways, or other suitable virtualized computing components. For example, a physical machine can include a server executing suitable instructions to provide a hypervisor configured to support one or more virtual machines for one or more users or tenants on the same server.

Also used herein, the term "cloud service" or "computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Further, as used herein, the term "operating condition" generally refers to a target status or parameter associated with operations of a physical machine. An operating condition can include, for example, a physical machine is connectable via a computer network; a physical machine has no active hardware failures; additional virtual machines can be deployed at a physical machine; or the individual physical machines have a threshold version of any hardware firmware or driver. In certain embodiments, a physical machine is deemed operating satisfactorily or "healthy" if the physical machine satisfies all the foregoing example operating conditions. On the other hand, a physical machine is deemed operating unsatisfactorily or "unhealthy" if the physical machine fails to satisfy at least one of the foregoing example operating conditions. In other embodiments, a physical machine can be deemed operating satisfactorily based on other suitable conditions.

Implementing cloud computing services typically involves utilizing many physical machines interconnected by a computer network to provide application execution, data storage, data retrieval, or other suitable computing operations. A management controller, such as a fabric controller, a cluster controller, etc., is typically utilized to monitor whether a physical machine or components thereof has failed. In response to detecting a failure of the physical machine or components thereof, the management controller can attempt to remedy the detected failure by, for instance, migrating virtual machines ("VMs") hosted on the failed physical machine to other physical machines in the distributed computing system, restarting the failed physical machine, and/or perform other suitable operations.

Such a remedial technique, however, can result in service interruptions to users because the remedial actions are reactive instead of proactive. For instance, only after a physical machine has failed, the management controller can issue commands to initiate various remedial actions. As such, computing services provided by VMs hosted on the failed physical machine can be interrupted during remediation of the failure. Such interruption can negatively impact user experience of the cloud computing services, generate a large volume of technical service calls, or cause other types of inefficiencies.

Several embodiments of the disclosed technology are directed to proactively monitor and "heal" physical machines before the physical machines experience a partial or complete failure. In certain embodiments, probes can be deployed to the physical machines to determine whether the individual physical machines are healthy or unhealthy in accordance with one or more operating conditions. By analyzing data from such determination, a machine manager can select a list of the unhealthy physical machines for performing a refreshing process in which operating systems, user applications, device drivers, or other suitable types of software components can be reinstalled on the selected physical machines. As such, several embodiments of the disclosed technology can thus improve user experience of utilizing cloud computing services by proactively monitor and heal physical machines before the physical machines completely fail and cause service interruption, as described in more detail below with reference to FIGS. 1A-5.

FIG. 1A is a schematic diagram illustrating a distributed computing system 100 implementing physical machine management in accordance with embodiments of the disclosed technology. In certain embodiments, the distributed computing system 100 can be a content management system that supports creation and modification of documents, images, audios, videos, or other suitable types of digital content. In other embodiments, the distributed computing system 100 can also be other suitable types of computing system. As shown in FIG. 1A, the distributed computing system 100 can include an underlay network 108 interconnecting a plurality of users 101 (shown as first, second, and third user 101a-101c, respectively), a computing fabric 104, and a machine manager 110. Even though particular components are shown in FIG. 1A, in other embodiments, the distributed computing system 100 can also include additional and/or different constituents. For example, the distributed computing system 100 can include network storage devices, utility infrastructures, and/or other suitable components in addition to or in lieu of those shown in FIG. 1A.

As shown in FIG. 1A, the underlay network 108 can include one or more physical network devices 112 that interconnect the users 101, the computing fabric 104, and the machine manager 110. Examples of the network devices 112 can include routers, switches, firewalls, load balancers, or other suitable network components. Even though particular connection scheme is shown in FIG. 1A for illustration purposes, in other embodiments, the network devices 112 can be operatively coupled in a hierarchical, flat, "mesh," or other suitable topologies.

The computing fabric 104 can include a management controller 102 and a plurality of physical machines 106 (shown in FIG. 1A as "PMs") operatively coupled to one another by the network devices 112. In certain embodiments, the physical machines 106 can individually include a physical server or a computing blade having several physical servers. In other embodiments, the physical machines 106 can also include other suitable types of computing devices.

The physical machines 106 can be organized into racks, availability zones, groups, sets, computing clusters, or other suitable divisions. For example, in the illustrated embodiment, the physical machines 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1A for illustration purposes, in other embodiments, the computing fabric 104 can include one, two, eight, sixteen, or any other suitable numbers of computing clusters 105 with similar or different components and/or configurations.

The management controller 102 can be configured to monitor, control, or otherwise manage operations of the physical machines 106 in the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more physical machines 106 in the computing clusters 105. In further embodiments, the management controller 102 can include software services hosted on one or more of the physical machines 106 in the computing clusters 105.

The machine manager 110 can be configured to proactively monitor operating conditions of the physical machines 106 and selectively refresh one or more of the physical machines 106 that are determined to operate unsatisfactorily in accordance with one or more operation conditions. For example, if a physical machine 106 experience an issue that prevents additional virtual machines to be deployed on the physical machine 106, the machine manager 110 can be configured to refresh the physical machine 106 by, for instance, reinstalling a new copy of an operating system or a virtual machine monitor on the physical machine 106. By refreshing the physical machine 106, the machine manager 110 can return the physical machine 106 to a healthy state before the physical machine 106 has completely failed. Certain example components of the machine manager 110 and details of operations are described in more detail below with reference to FIGS. 2A-4D.

Even though the machine manager 110 is shown in FIG. 1A as a separate component from the management controller 102 and the physical machines 106 of the distributed computing system 100, in other embodiments, certain functionalities of the machine manager 110 can a part of the management controller 102. In further embodiments, other functionalities of the machine manager 110 can also be provided as one or more computing services hosted on one or more of the physical machines 106 in the computing fabric 104.

In operation, the users 101 can request various cloud computing services (e.g., deployment of a site) via, for example, user portals 107. In response, the management controller 102 can allocate one or more physical machines 106 to execute suitable instructions to provide the requested computing services. Unlike in other computing systems, several embodiments of the distributed computing system 100 can proactively monitor a health status of the allocated physical machines 106 in accordance with one or more operating conditions and remedy any deficiencies before the physical machines 106 fail and cause service interruption. For example, the machine manager 110 can detect that one of the physical machines 106 is experiencing a hypervisor error that prevents deploying additional virtual machines 144 (shown in FIG. 1B) on the physical machine 106. Though the physical machine 106 can continue servicing existing virtual machines 144, the machine manager 110 can decide to migrate the existing virtual machines 144 to other healthy physical machines 106 and refresh the physical machine 106 before a complete failure. As such, service interruptions to the users 101 can be reduced when compared to reactive remedial techniques, as described in more detail below with reference to FIGS. 2A-3D.

Figure 1B:
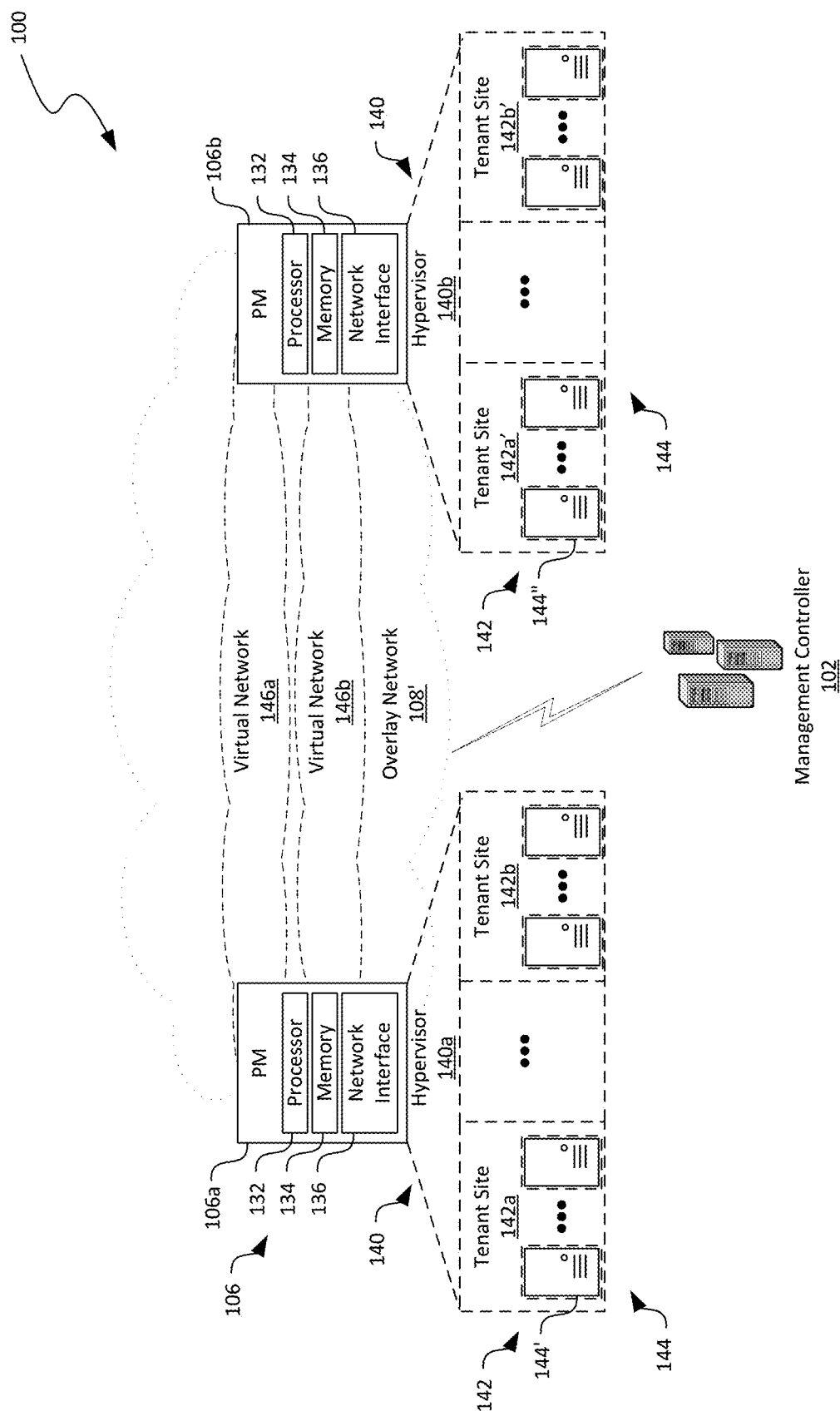
FIG. 1B is a schematic diagram illustrating certain hardware/software components of the distributed computing system of FIG. 1A in accordance with embodiments of the disclosed technology.

FIG. 1B is a schematic diagram illustrating certain hardware/software components of the distributed computing system 100 of FIG. 1A in accordance with embodiments of the disclosed technology. In FIG. 1B, only certain components of the distributed computing system 100 of FIG. 1A are shown for clarity. As shown in FIG. 1B, the first physical machine 106a (shown as "PM 106a") and the second physical machine 106b (shown as "PM 106b") can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4A-4D). The input/output component 136 can include a display, a touch screen, a keyboard, a mouse, a printer, and/or other suitable types of input/output devices configured to accept input from and provide output to an operator and/or an automated software controller (not shown).

The memory 134 of the first and second physical machines 106a and 106b can include instructions executable by the corresponding processors 132 to cause the individual physical machines 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 1B, the first physical machine 106a can provide a first hypervisor 140a that manages first and second tenant sites 142a and 142b, respectively, for the same or different tenants or users 101 (FIG. 1A). The second physical machine 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first physical machine 106a and the second physical machine 106b can both host the tenant site 142a and 142a' for a first user 101a. The first physical machine 106a and the second physical machine 106b can both host the tenant site 142b and 142b' for a second user 101b (FIG. 1A). Each virtual machine 144 can be executing a corresponding operating system, middleware, and/or applications.

Also shown in FIG. 1B, the distributed computing system 100 can include one or more virtual networks 146 that interconnect the tenant sites 142a and 142b across multiple physical machines 106. For example, a first virtual network 142a interconnects the first tenant sites 142a and 142a' at the first physical machine 106a and the second physical machine 106b. A second virtual network 146b interconnects the second tenant sites 142b and 142b' at the first physical machine 106a and the second physical machine 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1A) even though the virtual machines 144 are located on different physical machines 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a virtual network 146. Thus, different virtual networks 146 can use one or more virtual network addresses that are the same. Example virtual network addresses can include IP addresses, MAC addresses, and/or other suitable addresses.

FIGS. 2A-2D are schematic diagrams illustrating certain hardware/software components of the distributed computing system 100 in FIG. 1A during certain stages of managing physical machines 106 in the distributed computing system in accordance with embodiments of the disclosed technology. In particular, FIGS. 2A-2D illustrate the distributed computing system 100 during a data collection stage, a migration stage, a refresh stage, and a refresh monitoring stage of managing the physical machines 106, respectively. In FIGS. 2A-2D, certain components of the distributed computing system 100 are omitted for clarity. For example, only one computing cluster 105 having a first, second, and third physical machines 106, 106', and 106" are shown in FIGS. 2A-2D for illustration purposes.

In addition, in FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
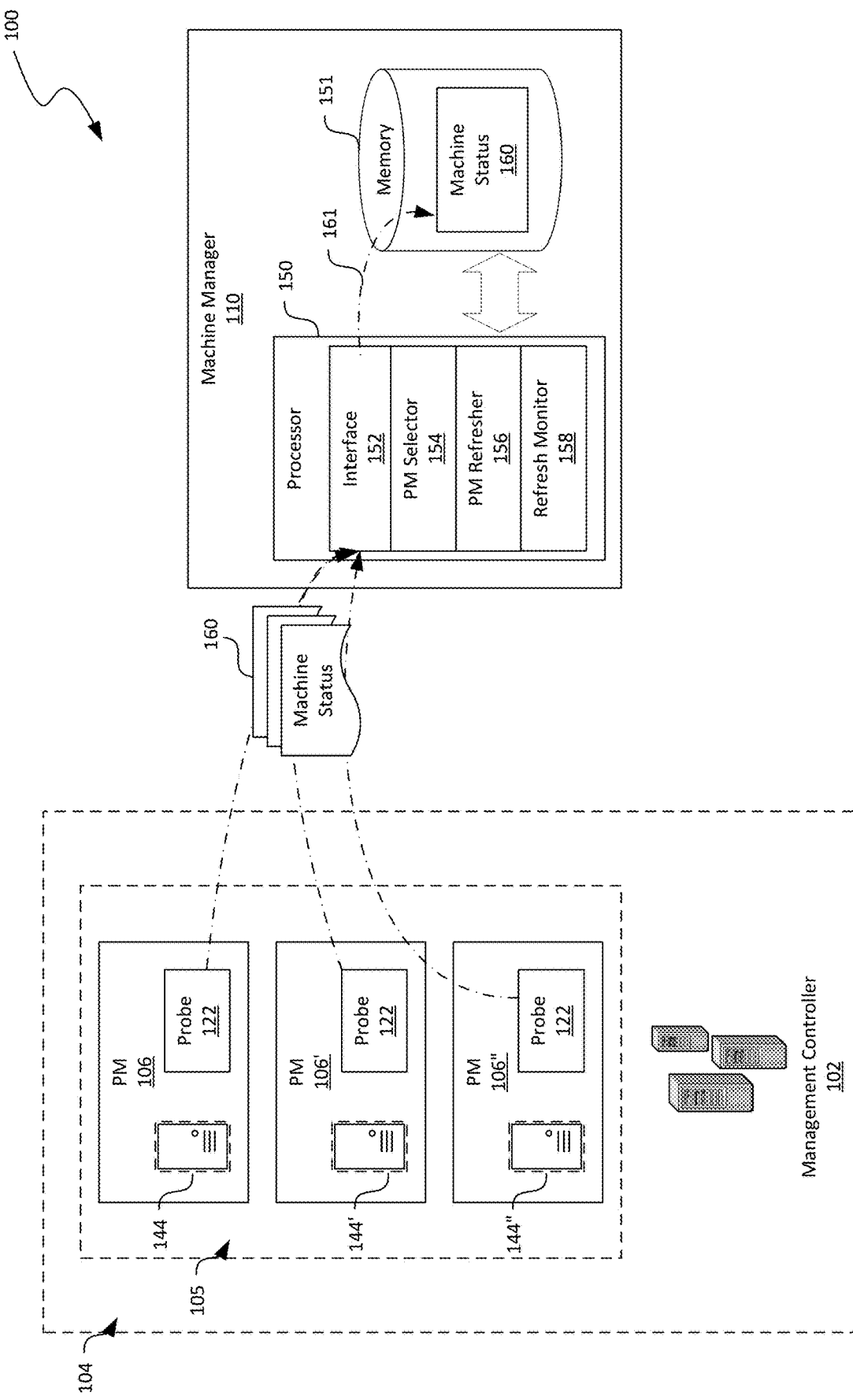
FIGS. 2A-2D are schematic diagrams illustrating certain hardware/software components of the distributed computing system in FIG. 1A during certain stages of managing physical machines in the distributed computing system in accordance with embodiments of the disclosed technology.

As shown in FIG. 2A, the individual physical machines 106 can deploy a probe 122 configured to scan the corresponding physical machines 106 for determining a machine status of the corresponding physical machines 106. The probes 122 can be configured to be executed on corresponding physical machines 122 periodically at certain time of day, week, month, or other suitable time intervals. In certain implementations, the physical machines 106 can be categorized based on operating status as running, migrating, stopped, failed, refreshing, or other suitable status types. The probes 122 can be executed on physical machines 106 with running, draining, stopped, or failed operating status but not refreshing. In other implementations, the physical machines 106 can be categorized in other suitable manners and/or the probes 122 can be executed on all the physical machines 106. In certain embodiments, the probes 122 can be individual standalone applications. In other embodiments, the probes 122 can be a component, module, or routine of an operating system (not shown) of the physical machines 106. In yet further embodiments, the probes 122 can have other suitable configurations.

In certain embodiments, the probes 122 can be configured to determine whether a corresponding physical machine 106 is healthy in accordance with one or more operating conditions. In one implementation, a physical machine 106 is deemed healthy when the physical machine 106 (1) can be connected and accessed via the underlay network 108 (FIG. 1A); (2) has no active hardware failures; (3) can deploy additional virtual machines 144; and (4) has hardware firmware/drivers with a threshold version number (e.g., last one, two, or three available version numbers). For example, the physical machine 106 is determined to be connectable when the following example services are operating correctly:

Domain name system service;
PowerShell remoting service;
Operating system interface services through which instrumented components can provide information and/or notification; and
Software update service.

In another example, the physical machine 106 is determined to have no hardware failures when the physical machine 106 has none of the following example hardware failures:

Chassis error;
Power collection error;
Cooling error;
Management processor error;
Main processor error;
Storage enclosure processor error;
Disk drive error;
Storage volume error;
System read-only-memory error; or
Ethernet port error.

In yet another example, the physical machine 106 is determined to be able to deploy additional virtual machines when a partition, status, directory, network, or other suitable components of a hypervisor 140 (FIG. 1B) on the physical machine 106 are operating correctly.

In another implementation, the physical machine 106 is deemed healthy when the management controller 102 maintains a "running" state for the physical machine 106 in addition to the foregoing example operating conditions. In further embodiments, other suitable criteria may also be applied when determining whether a physical machine 106 is healthy. In certain embodiments, a physical machine 106 can be deemed unhealthy if any of the foregoing operating conditions are not met. In other embodiments, a physical machine 106 can be deemed unhealthy based on other suitable criteria or combinations thereof.

As shown in FIG. 2A, in operation, the probes 122 can be executed on the respective physical machines 122 to generate data representing a machine status 160 of the corresponding physical machines 122. In one implementation, the machine status 160 can indicate all operating conditions that are not met by a physical machine 106. In other implementations, the operation conditions can be individually associated with a priority level. For example, when a physical machine 106 fails to deploy additional virtual machines 144, the physical machine 106 can be marked as undeployable with a first priority level. When the physical machine 106 also has a hard disk failure, the same physical machine 106 can also be marked as having a hardware failure with a second priority level lower than the first priority level. In certain embodiments, the machine status 160 can include only the highest priority operating condition (e.g., undeployable), two highest priority operating condition (e.g., both undeployable and hardware failure), or all operating conditions that are not met.

The machine status 160 can also contain various other suitable information. For example, in certain embodiments, the machine status 160 can contain one or more of the following information:

Physical machine ID
Physical machine Name
Computing cluster/zone ID
Physical machine type
Operating state
Scan date
Refreshing state
Environment
Data source (e.g., the probes 122)
Connectable—True/False
Hardware Failure—True/False
VM Deployable—True/False
Hardware firmware/driver Current —True/False In other embodiments, the machine status 160 can also contain a scan start date/time, a scan complete date/time, or other suitable information.

The probes 122 can then transmit the machine status 160 to the machine manager 110 for further processing and storage. As shown in FIG. 2A, the machine manager 110 can include a processor 150 operatively coupled to a memory 151 containing instructions executable by the processor 150 to provide certain software components. For example, in the illustrated embodiment, the machine manager 110 can include an interface component 152, a PM selector 154, a PM refresher 156, and a refresh monitor 158 operatively coupled to one another. In other embodiments, the machine manager 110 can also include a database manager, a network manager, or other suitable components.

As shown in FIG. 2A, the interface component 152 can be configured to receive the machine status 160 from the probes 122 executing at the corresponding physical machines 106. The interface component 152 can then process and store the received machine status 160 (as indicated by the arrow 161) as database records in the memory 151. In certain embodiments, the interface component 152 can include an application programming interface ("API"). In other embodiments, the interface component 152 can include other suitable types of network and/or application interface.

The PM selector 154 can be configured to select a list of physical machines 106 for refreshing based on the database records of the machine status 160 stored in the memory 151. In certain embodiments, the PM selector 154 can be executed periodically per computing cluster, zone, or other suitable divisions of the distributed computing system 100 and process physical machines 106 marked by the probes 122 as failing at least one of the operating conditions. In other embodiments, the PM selector 154 can be executed upon receiving new machine status 160, upon request by an administrator, or based on other suitable criteria.

The PM selector 154 can be configured to select the list of physical machines 106 based on various criteria. In certain embodiments, the PM selector 154 can select all physical machines 106 that violates at least one operation condition. For example, the PM selector 154 can select all physical machines 106 that are not deployable, have hardware failures, cannot be connected, or has a hardware firmware/drivers without a threshold version number. In other embodiments, the PM selector 154 can select only physical machines 106 with certain types, priority levels, or other characteristics of operating condition violations. For example, the PM selector 154 can select only the physical machines 106 that are not deployable.

The PM selector 154 can also be configured to maintain a capacity threshold in the computing cluster 105 (or other suitable divisions in the distributed computing system 100). For example, the PM selector 154 can be configured to determine a first group of healthy physical machines 106 and a second group of unhealthy physical machines 106 based on the machine status 160. The PM selector 154 can then determine whether the second group of physical machines 106 exceeds a threshold (e.g., 5% of a total number of physical machines 106 in the computing cluster 105). If the PM selector 154 determines that the second group of physical machines 106 does not exceed the threshold, the PM selector 154 can mark all the physical machines 106 in the second group for refreshing. On the other hand, if the PM selector 154 determines that the second group of physical machines 106 does exceed the threshold, the PM selector 154 can select a subset of the physical machines 106 from the second group randomly, based on machine ID, or in other suitable manners. As such, a computing/storage capacity in the computing cluster 105 can be maintained.

Figure 2B:
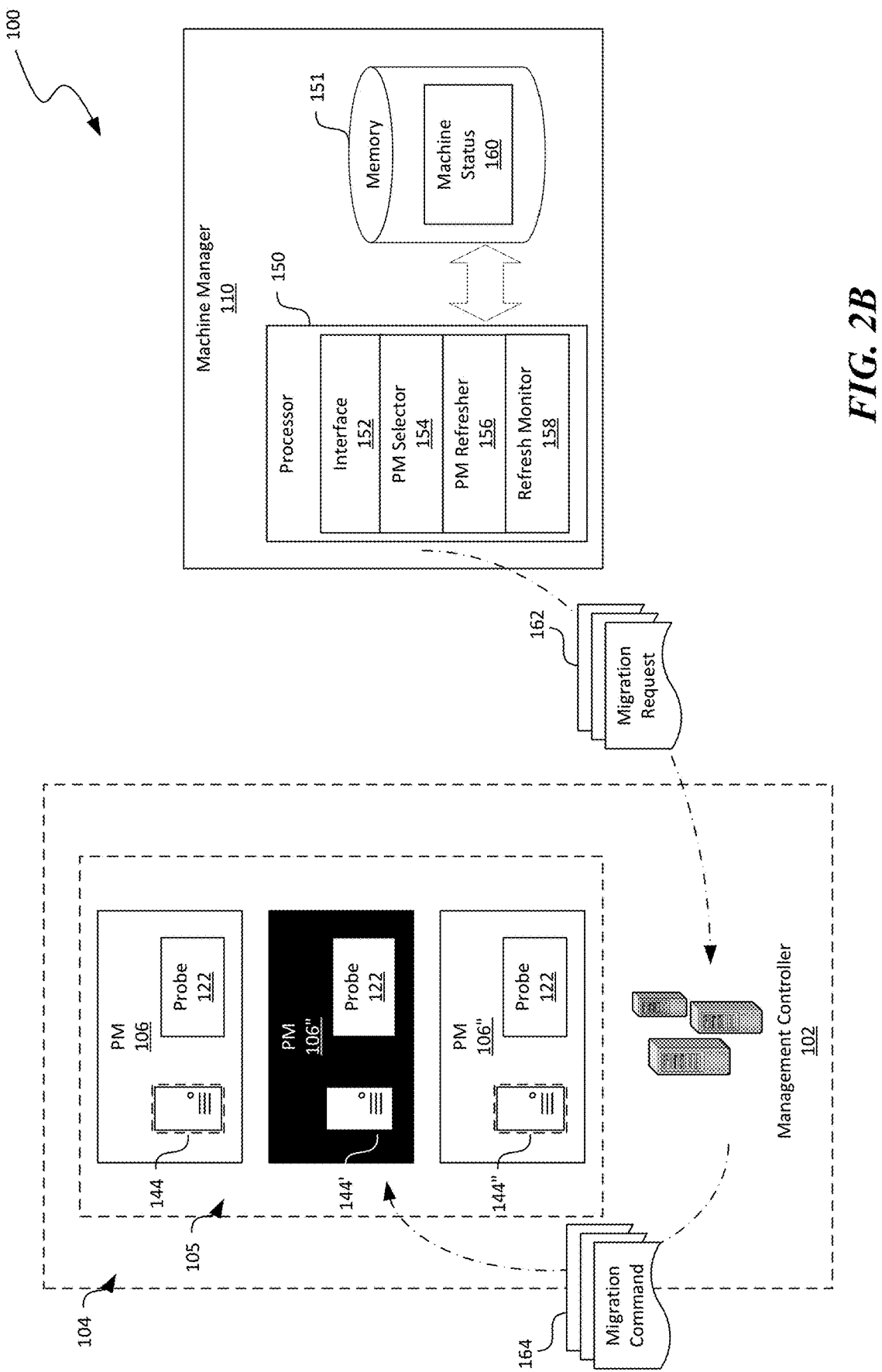

As shown in FIG. 2B, in the illustrated example, the PM selector 154 has selected the second physical machine 106' (shown in reverse contrast for illustration purposes) for refreshing. Upon determination of the physical machines 106 for refreshing, the PM refresher 156 can be configured to first determine whether the second physical machine 106 is currently hosting any virtual machines 144. In certain embodiments, the PM refresher 156 can perform such determination based on the machine status 160. In other embodiments, the PM refresher 156 can perform such determination by consulting the management controller 102 or via other suitable techniques. In the illustrated example in FIG. 2B, the PM refresher 156 can determine that the second physical machine 106 is hosting a virtual machine 144'. In response, the PM refresher 156 can transmit a migration request 162 to the management controller 102 requesting the virtual machine 144' be redeployed to other physical machines 106 in the computing cluster 105 or in other computing clusters 105 (FIG. 1A). in response, the management controller 102 can issue a migration command 164 to the physical machine 106' to migrate the virtual machine 144' to the first physical machine 106.

Figure 2C:
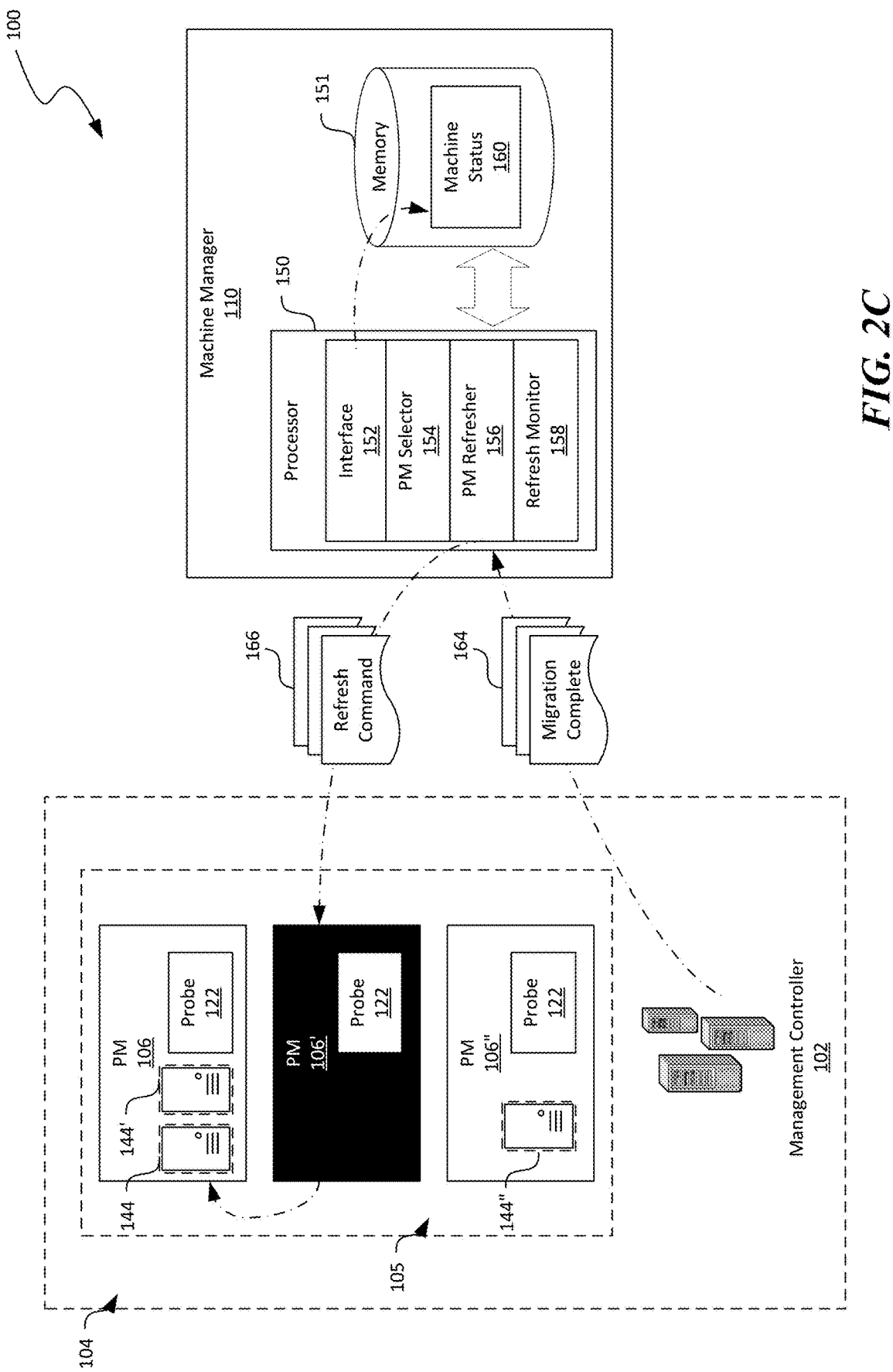

As shown in FIG. 2C, once the virtual machine 144' is migrated to the first physical machine 106, the management controller 102 can transmit a message of migration complete to the PM refresher 156. In response, the PM refresher 156 can issue a refresh command 166 to the second physical machine 106' to initiate a refreshing process. The refresh command 166 can cause the second physical machine 106' to cycle power, reinstall a new copy of at least one of an operating system, a user application, a device driver, or other suitable software components, restart the second physical machine 106' with the new copy, or perform other suitable operations to reset the second physical machine 106'.

Figure 2D:
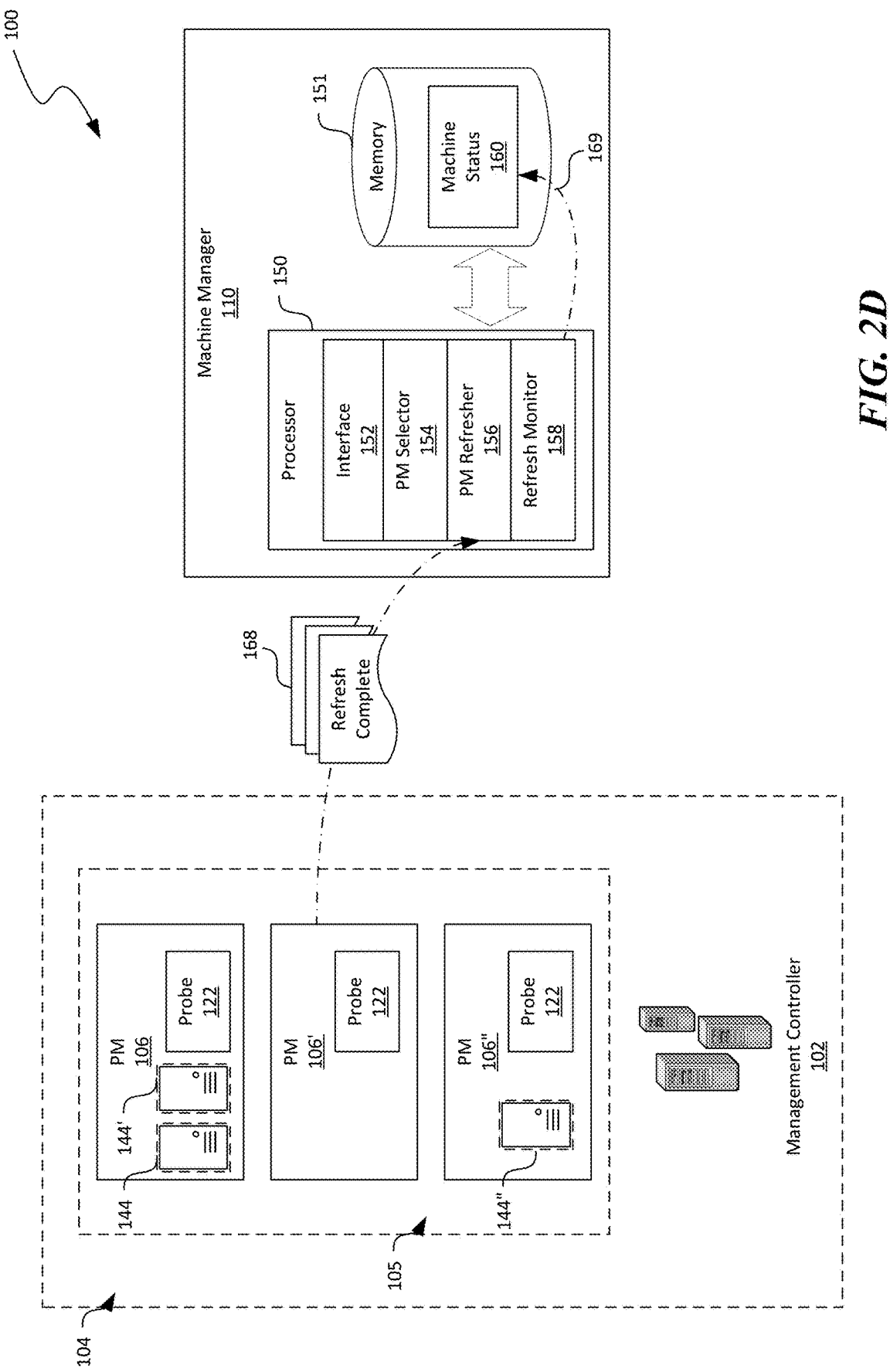

As shown in FIG. 2D, during the refreshing process, the refresh monitor 158 can be configured to monitor a progress and/or status of the refreshing process. In certain embodiments, the refresh monitor 158 can be configured to determine whether an elapsed time of the refreshing process since the initiation exceeds a threshold. If the threshold is exceeded, the refresh monitor 158 can be configured to raise an alarm, transmit an error message, or perform other suitable operations. If the threshold is not exceeded when the refreshing process is completed, for example, by receiving the refresh complete message 168, the refresh monitor 158 can record a date/time of completion of the refreshing process, as indicated by the arrow 169, in the machine status 160, without raising an alarm.

Several embodiments of the disclosed technology can thus improve user experience of cloud computing services by proactively monitor and heal physical machines 106 before the physical machines 106 completely fail and cause service interruption. For example, by periodically receiving and analyzing operating conditions of the physical machines 106, operating difficulties encountered by the physical machines 106 can be addressed before such operating difficulties can cause a partial or complete failure of the physical machine 106. As such, occurrences or risks of physical machine failure can be reduced to result in reduced computing service interruptions to users 101 (FIG. 1).

Figure 3:
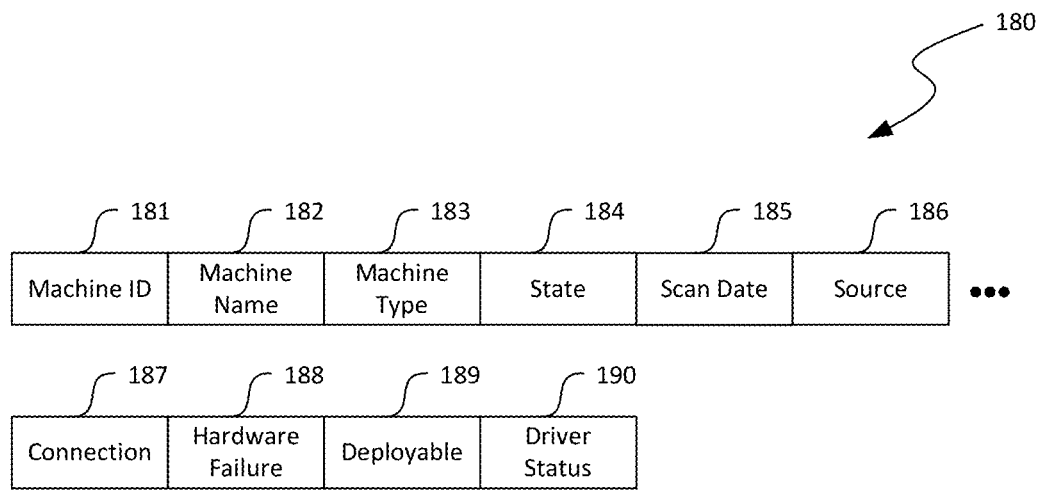
FIG. 3 is an example data schema suitable for a machine status record in accordance with embodiments of the disclosed technology.

FIG. 3 is an example data schema 180 suitable for a machine status record in accordance with embodiments of the disclosed technology. As shown in FIG. 3, the example data schema 180 can include a machine ID field 181, a machine name field 183, a state field 184, a scan date field 185, a source field 186, a connection field 187, a hardware failure field 188, a deployable field 189, and a driver status field 190. In other examples, the data schema 180 can also include refreshing status, refreshing start date/time, refreshing completion date/time, or other suitable fields.

The machine ID field can be configured to store an alphanumerical value corresponding to a series number or other suitable identification of a physical machine 106 (FIG. 1A). The machine name field can be configured to store a string value corresponding to a name of a physical machine 106. The machine type field 183 can be configured to store an alphanumeric value corresponding to a type, class, category, or other suitable designation associated with a physical machine 106. The state field 184 can be configured store a string value indicating, for example, a physical machine 106 is running, migrating, stopped, failed, refreshing, or other suitable status values. The scan date field 185 can be configured to contain a date/time value at which a physical machine 106 is scanned for violation of one or more operating conditions. The source field 186 can be configured to contain a string or numerical value identifying a source of the machine status 160 (FIG. 2A). The connection field 187, the hardware failure field 188, the deployable field 189, and the driver status field 190 can be configured to individually contain a Boolean value indicating whether a physical machine 106 is connectable via the underlay network 108 (FIG. 1A), has hardware failure(s), can deploy additional virtual machines 144 (FIG. 1B), and have hardware firmware/drive with threshold version numbers, respectively.

FIGS. 4A-4D are flowcharts illustrating various aspects of processes of managing physical machines in a distributed computing system in accordance with embodiments of the disclosed technology. Even though aspects of the processes are described below with reference to the distributed computing system 100 of FIGS. 1A and 1B, in other embodiments, the processes can also be implemented in other computing systems with different or additional components.

Figure 4A:
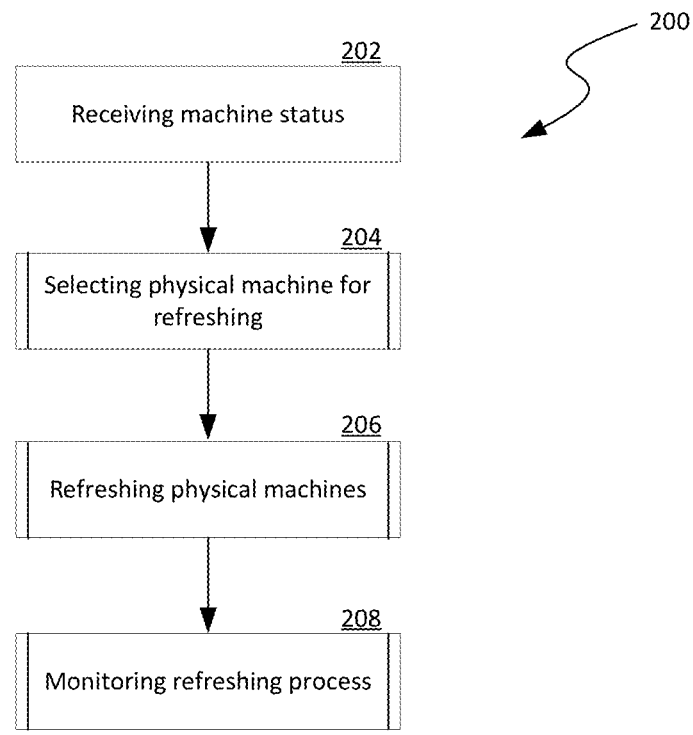
FIGS. 4A-4D are flowcharts illustrating various processes of managing physical machines in a distributed computing system in accordance with embodiments of the disclosed technology.

As shown in FIG. 4A, the process 200 can include receiving data representing machine status at stage 202. As described above with reference to FIG. 2A, the machine status can be generated by the probes 122 (FIG. 2A) deployed at the individual physical machines 106 (FIG. 2A). The process 200 can then include selecting one or more physical machines 106 for refreshing at stage 204. The one or more physical machines 106 can be selected based on the received machine status in various ways. Example operations of selecting the one or more physical machines 106 are described in more detail below with reference to FIG. 4B.

The process 200 can also include refreshing the selected physical machines at stage 206. Refreshing the physical machines 106 can include reinstalling a new copy of an operating system, user application, and device driver and restarting the physical machines 106 with the reinstalled new copy of the operating system, user application and device driver. Example operations of refreshing the physical machines 106 are described in more detail below with reference to FIG. 4C. The process 200 can further include monitoring a refreshing process associated with the physical machines 106 at stage 208. Example operations of monitoring the refreshing process are described in more detail below with reference to FIG. 4D.

Figure 4B:
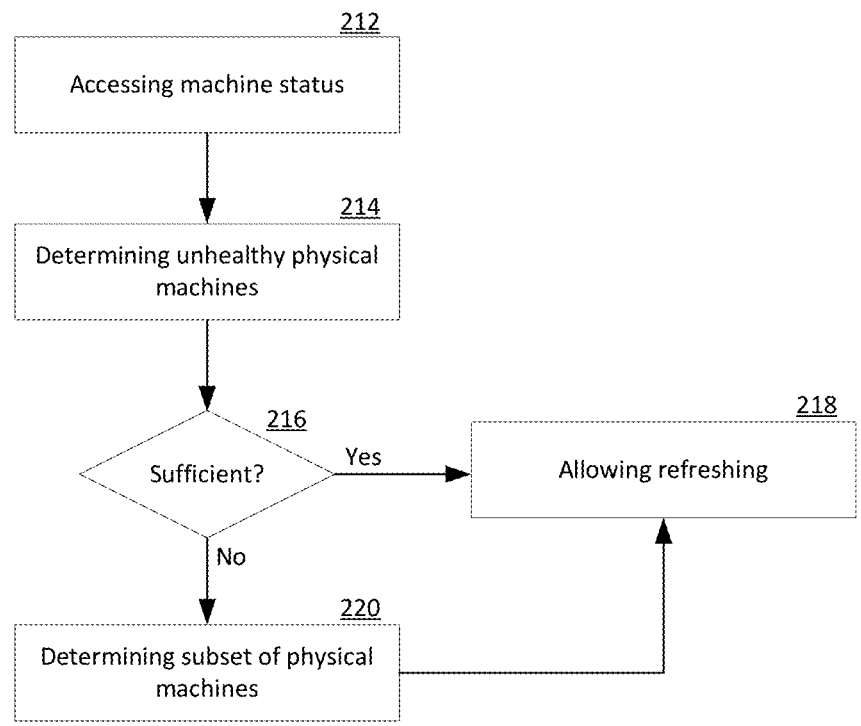

As shown in FIG. 4B, operations of selecting the physical machines 106 can include accessing database records of machine status at stage 212, from, for example, the memory 151 (FIG. 2A). The operations can then include determining unhealthy physical machines 106 based on the accessed machine status, as described above with reference to FIG. 2B. The operations can also include a decision stage 216 to determine whether a sufficient number of physical machines 106 are still available in the computing cluster 105 (FIG. 2B). In response to determining that a sufficient number of physical machines 106 are still available in the computing cluster 105, the operations include allowing refreshing of all unhealthy physical machines 106. In response to determining that a sufficient number of physical machines 106 are not available in the computing cluster 105, the operations include determining a subset of the unhealthy physical machines at stage 220 before allowing refreshing of the subset of the unhealthy physical machines.

Figure 4C:
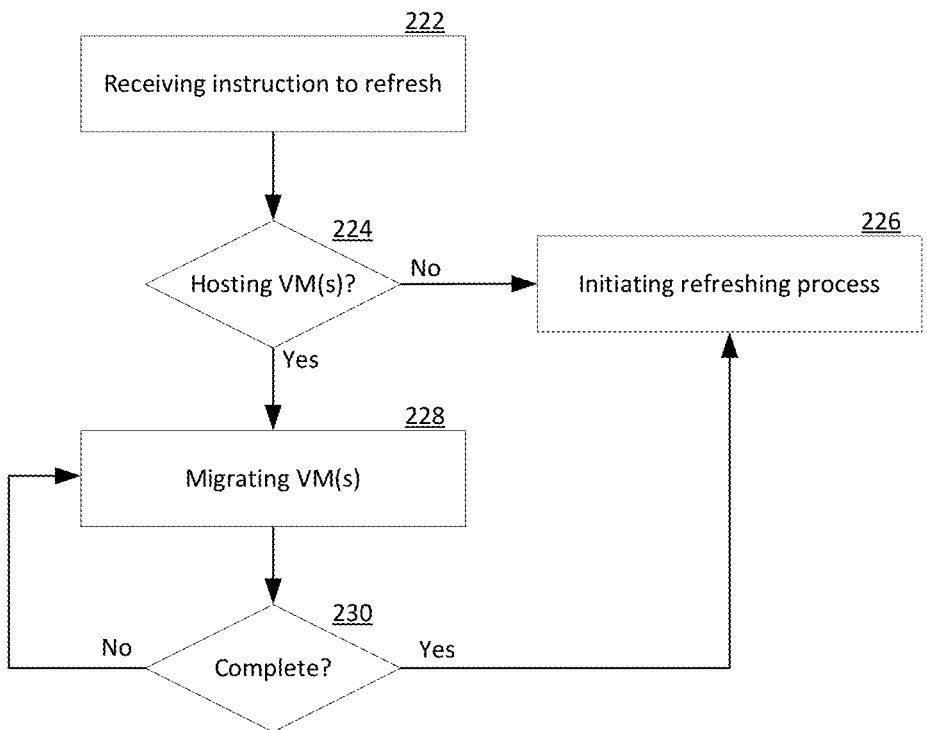

As shown in FIG. 4C, the operations of refreshing a physical machine can include receiving instruction to initiate a refreshing process at sage 222. The operations can then include a decision stage 224 to determine whether the physical machine is hosting any virtual machines. In response to determining that the physical machine is not hosting at least one virtual machine, the operations include initiating the refreshing process at stage 226. In response to determining that the physical machine is hosting at least one virtual machine, the operations include migrating the at least one virtual machine from the physical machine at stage 228. The operations can then include another decision stage 230 to determine whether the migration operation is complete. In response to determining that the migration is complete, the operations can include initiating the refreshing process at stage 226.

Figure 4D:
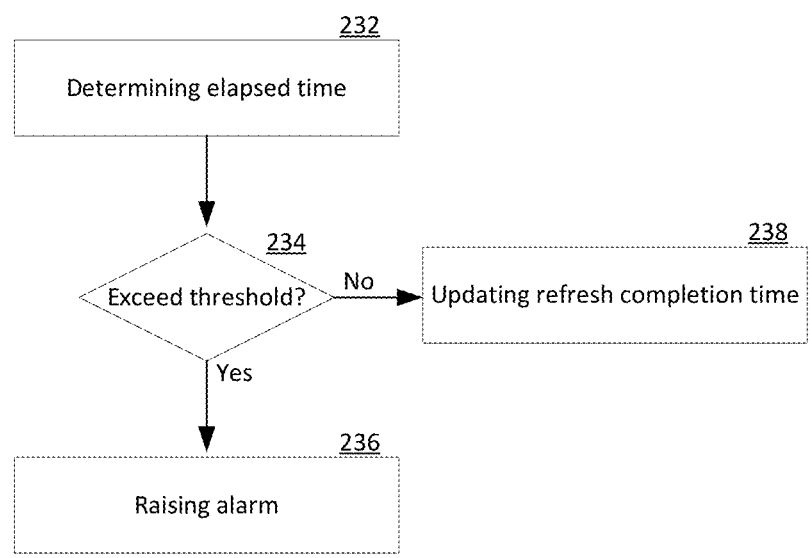

As shown in FIG. 4D, operations of monitoring a refreshing process can include determining an elapsed time since initiation of the refreshing process at stage 232. The operations can then include a decision stage 234 to determine whether the elapsed time exceeds a threshold. In response to determining that the elapsed time exceeds the threshold, the operations include raising an alarm at stage 236. In response to determining that the elapsed time does not exceed the threshold, the operations include updating a database record with a completion date/time of the refreshing process at stage 238.

Figure 5:
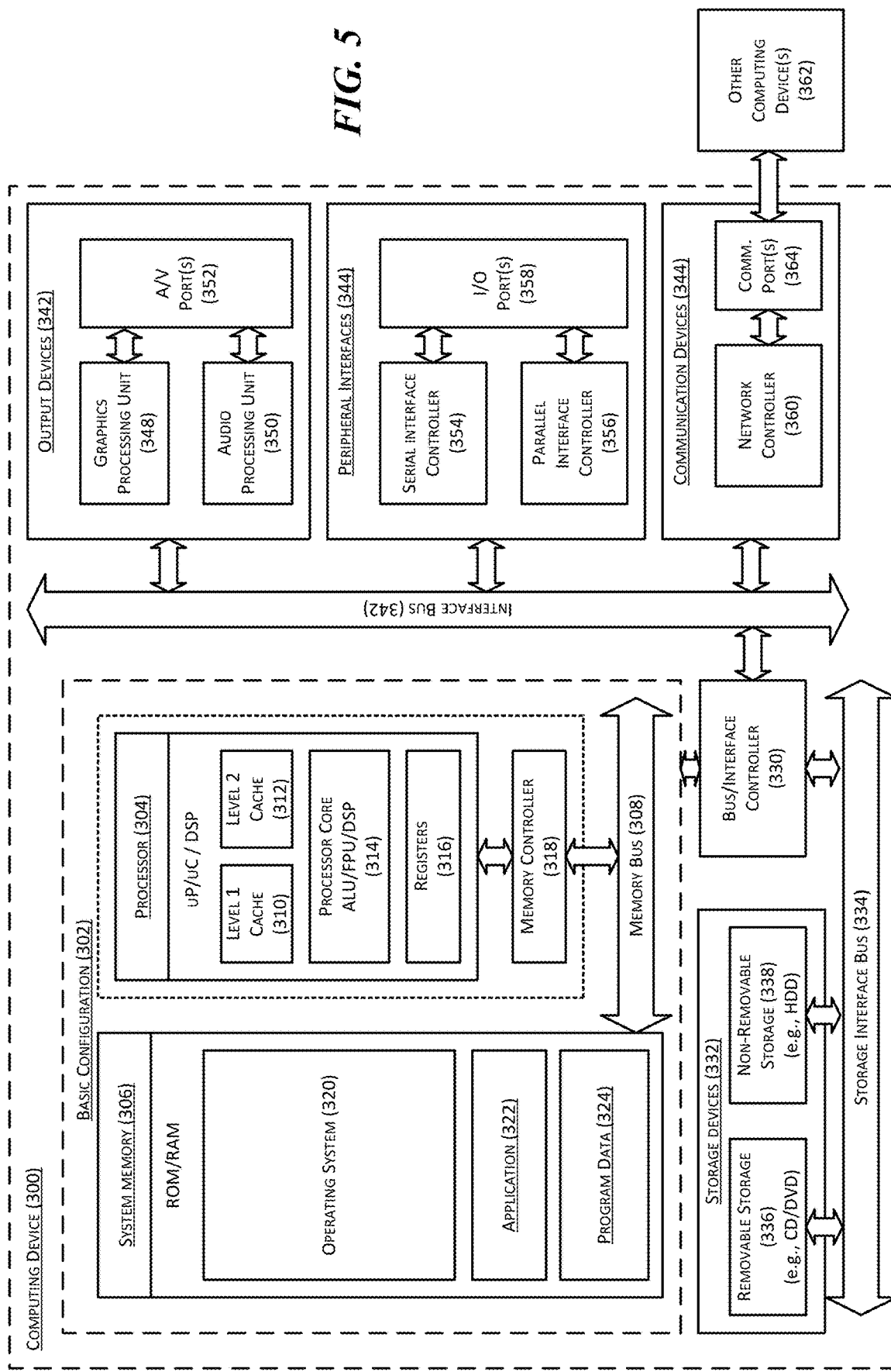
FIG. 5 is a computing device suitable for certain components of the computing system in FIG. 1A.

FIG. 5 is a computing device 300 suitable for certain components of the distributed computing system 100 in FIG. 1A. For example, the computing device 300 can be suitable for the physical machines 106, the management controller 102, or the machine manager 110 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of physical machine management in a distributed computing system having multiple physical machines interconnected by a computer network, the method comprising:
    receiving, via the computer network, data representing an operating status of the physical machines;
    based on the received data, identifying a first group of the physical machines that are operating satisfactorily in accordance with a set of target operating conditions and a second group of the physical machines that are likely to fail but have not yet partially or completely failed including, for each of the physical machines,
    determining whether the operating status of the physical machine indicating a failure of a local computing service in a preset group of failures of software services individually identified as an indicator of a likelihood of failure of the physical machine; and
    in response to determining that the operating status of the physical machine indicating a failure of a software service in the preset group, assigning the physical machine to the second group;
    determining whether a total number of the physical machines in the first group exceeds a preset threshold; and in response to determining that the total number of the physical machines in the first group exceeds the preset threshold, refreshing the physical machines in the second group including:

reinstalling at least one of an operating system, a user application, or a device driver on the physical machines in the second group with a new copy; and restarting the physical machines in the second group upon installation of the new copy of at least one of the operating system, the user application, or the device driver, thereby allowing the second group of the physical machines to operate satisfactorily in accordance with the set of target operating conditions.

2. The method of claim 1 wherein refreshing the physical machines in the second group further includes:

determining whether the individually physical machines in the second group are hosting one or more virtual machines; and in response to determining that the individual physical machines are hosting at least one virtual machine, migrating the at least one virtual machine to one or more other physical machines in the first group prior to performing the reinstalling and restating operations to the physical machines in the second group.

3. The method of claim 1, further comprising:

in response to determining that the total number of the physical machines in the first group does not exceed the preset threshold, selecting a subset of the second group of the physical machines; and refreshing only the subset of the second group of the physical machines, thereby allowing a target number of the physical machines in the first group.

4. A computing device in a distributed computing system having multiple physical machines interconnected by a computer network, the computing device comprising:

a processor; and a memory operatively coupled to the processor, the memory containing instructions executable by the processor to cause the computing device to:

perform analysis of data representing an operating status of the individual physical machines;

based on the performed analysis, identify a physical machine that is likely to fail but has not yet partially or completely failed by determining whether the operating status of the physical machine indicates a failure of a local computing service on the physical machine in a preset group of failures of software services individually identified as an indicator of a likelihood of failure of the physical machine and in response to determining that the operating status of the physical machine indicating a failure of a software service identified in the preset group, identifying the physical machine as being likely to fail;

determine whether the identified physical machine is hosting at least one virtual machine; and in response to determining that the physical machine is hosting at least one virtual machine, refresh the physical machine by:

migrating the at least one virtual machine to one or more other physical machines in the distributed computing system;

subsequent to completion of migration, reinstalling a new copy of at least one of an operating system, a user application, or a device driver on the one of the physical machines; and reinitiating the physical machine with the new copy of the at least one of the operating system, the user application, or the device driver.

5. The computing device of claim 4 wherein:

the identified physical machine is one of multiple physical machines; and the memory contains additional instructions executable by the processor to cause the computing device to, subsequent to reinitiating the physical machine, determine whether another one of the physical machines is hosting at least one virtual machine; and in response to determining that the another one of the physical machines is not hosting at least one virtual machine, reinstall a new copy of at least one of an operating system, a user application, or a device driver on the another one of the physical machines; and reinitiate the another one of the physical machines with the new copy of the at least one of the operating system, the user application, or the device driver.

6. The computing device of claim 4 wherein in response to determining that the physical machine is not hosting at least one virtual machine, omit migrating the at least one virtual machine to one or more other physical machines in the distributed computing system.

7. The computing device of claim 4 wherein:

the identified physical machine is one of multiple physical machines; and the memory contains additional instructions executable by the processor to cause the computing device to:

determine whether a total number of the multiple physical machines in the list exceeds a threshold; and in response to determining that the total number of the multiple physical machines does not exceed the threshold, concurrently refresh the multiple physical machines.

8. The computing device of claim 4 wherein:

the identified physical machine is one of multiple physical machines; and the memory contains additional instructions executable by the processor to cause the computing device to:

determine whether a total number of the multiple physical machines in the list exceeds a threshold; and in response to determining that the total number of the multiple physical machines exceeds the threshold, select a subset of the multiple physical machines based on a priority level of corresponding operating conditions that the multiple physical machines are not operating satisfactorily; and concurrently refresh the subset of the physical machines, thereby maintaining a preset number of available physical machines in the distributed computing system.

9. The computing device of claim 4 wherein the one or more target operating conditions include at least one of:

that the individual physical machines are connectable via the computer network;

that the individual physical machines have no active hardware failure;

that additional virtual machines are deployable at the individual physical machines; or that the individual physical machines have a threshold version of any hardware firmware or driver.

10. The computing device of claim 4 wherein the memory contains additional instructions executable by the processor to cause the computing device to monitor a process of refreshing the physical machine by:

determining whether an elapsed time between initiating the refresh process and a completion of the refresh process exceeds a threshold; and in response to determining that the elapsed time exceeds the threshold, providing an alarm to an administrator of the distributed computing system.

11. The computing device of claim 4 wherein the memory contains additional instructions executable by the processor to cause the computing device to monitor a process of refreshing the physical machine by:

determining whether an elapsed time between initiating the refresh process and a completion of the refresh process exceeds a threshold;

in response to determining that the elapsed time exceeds the threshold, providing an alarm to an administrator of the distributed computing system; and in response to determining that the elapsed time does not exceed the threshold, recording a completion time of the refresh process corresponding to the physical machine.

12. A method of physical machine management in a distributed computing system having multiple physical machines interconnected by a computer network, the method comprising:

accessing data representing an operating status of the physical machines;

performing analysis of the accessed data based on one or more target operating conditions;

based on the analysis of the accessed data, identifying a list of the physical machines that are likely to fail but have not failed yet by determining whether the operating status of the individual physical machines in the list indicates a failure of a local computing service on the corresponding physical machines in a preset group of failures of software services individually identified as an indicator of a likelihood of failure of the physical machines and in response to determining that the operating status of the individual physical machines indicating a failure of a software service identified in the preset group, adding the individual physical machines to the list;

determining whether the individually physical machines in the list are hosting one or more virtual machines; and in response to determining that one of the physical machines in the list is not hosting one or more virtual machines, overwriting at least one of an operating system, a user application, or a device driver on the one of the physical machines with a new copy; and restarting the one of the physical machines with the new copy of at least one of the operating system, the user application, or the device driver.

13. The method of claim 12, further comprising:

in response to determining that one of the physical machines in the list is hosting one or more virtual machines, migrating the one or more virtual machines from the one of the physical machines to one or more other physical machines in the distributed computing system;

subsequent to completion of migrating the one or more virtual machines, overwriting at least one of an operating system, a user application, or a device driver on the one of the physical machines with a new copy; and restarting the one of the physical machines with the new copy of at least one of the operating system, the user application, or the device driver.

14. The method of claim 12, further comprising:

determining whether a number of the physical machines in the list exceeds a threshold; and in response to determining that the number of the physical machines in the list exceeds the threshold, selecting a subset of the physical machines from the list, the subset has another number of the physical machines not exceeding the threshold; and wherein determining whether the individually physical machines in the list are hosting one or more virtual machines includes determining whether the individually physical machines in the subset are hosting one or more virtual machines.

15. The method of claim 12, further comprising:

determining whether a number of the physical machines in the list exceeds a threshold; and in response to determining that the number of the physical machines in the list does not exceed the threshold, proceeding to determining whether the individually physical machines in the list are hosting one or more virtual machines.

16. The method of claim 12 wherein the one or more target operating conditions include at least one of:

that the individual physical machines are connectable via the computer network;

that the individual physical machines have no active hardware failure;

that additional virtual machines are deployable at the individual physical machines; or that the individual physical machines have a threshold version of any hardware firmware or driver.

17. The method of claim 16 wherein the individual physical machines are connectable via the computer network when one or more of the following conditions are met:

the individual physical machines have no domain name system error;

the individual physical machines are remotely accessible;

a diagnosing service is functional at the individual physical machines; or a software update service is functional at the individual physical machines.

18. The method of claim 16 wherein the active hardware failure includes one or more of:

a power supply failure;

a cooling failure;

a management processor failure;

a firmware failure;

a processor failure;

a disk drive failure;

a storage volume failure; or an Ethernet port failure.

19. The method of claim 16 wherein the additional virtual machines are deployable when a hypervisor is functioning at the individual physical machines.

20. The method of claim 12 wherein:

the target operating conditions are individually associated with a high priority level or a low priority level; and identifying the list of the physical machines includes:

identifying the list of the physical machines individually having the high priority level or the low priority level when a number of the physical machines does not exceed a threshold; or identifying the list of the physical machines individually having the high priority level when the number of the physical machines exceeds the threshold.

* * * * *